(12) United States Patent
Shirato et al.

(10) Patent No.: US 12,126,237 B2
(45) Date of Patent: Oct. 22, 2024

(54) LINEAR VIBRATION MOTOR AND LINEAR VIBRATION SYSTEM

(71) Applicant: Murata Manufacturing Co., Ltd., Nagaokakyo (JP)

(72) Inventors: Kenichi Shirato, Nagaokakyo (JP); Masahiro Ozawa, Nagaokakyo (JP); Kazuhide Takata, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 558 days.

(21) Appl. No.: 17/405,353

(22) Filed: Aug. 18, 2021

(65) Prior Publication Data

US 2021/0384810 A1 Dec. 9, 2021

Related U.S. Application Data

(63) Continuation of application No. PCT/JP2020/005526, filed on Feb. 13, 2020.

(30) Foreign Application Priority Data

Feb. 19, 2019 (JP) ................................ 2019-027436

(51) Int. Cl.
*H02K 33/18* (2006.01)
*B06B 1/04* (2006.01)
*H02K 33/16* (2006.01)

(52) U.S. Cl.
CPC .............. *H02K 33/18* (2013.01); *B06B 1/04* (2013.01); *H02K 33/16* (2013.01)

(58) Field of Classification Search
CPC ........... B06B 1/04; H02K 33/18; H02K 33/16
(Continued)

(56) References Cited

U.S. PATENT DOCUMENTS

| 7,868,489 B2 * | 1/2011 | Amemiya | H02K 33/00 310/13 |
| 8,164,224 B2 * | 4/2012 | Shen | H02K 33/16 310/36 |

(Continued)

FOREIGN PATENT DOCUMENTS

| JP | H0715937 A | 1/1995 |
| JP | 2008259409 A | 10/2008 |
| JP | 2017093227 A | 5/2017 |

OTHER PUBLICATIONS

International Search Report issued for PCT/JP2020/005526, date of mailing May 12, 2020.
(Continued)

*Primary Examiner* — Alex W Mok
(74) *Attorney, Agent, or Firm* — ArentFox Schiff LLP

(57) ABSTRACT

A linear vibration motor and a linear vibration system include a housing, a moving member, a drive unit including a driving coil and driving magnets, and a bias unit including a biasing electromagnet and biasing magnets. The moving member vibrates in a first direction substantially orthogonal to a winding axis of the driving coil with Lorentz force generated by a magnetic field formed by the driving coil and a magnetic field formed by the driving magnets. The biasing electromagnet and the biasing magnets are disposed such that the same poles substantially face each other, and the moving member is biased in the first direction by a magnetic spring generated from a repulsive force between the biasing electromagnet and the biasing magnets. Moreover, a magnetic spring constant of the magnetic spring varies with variation in a value of a current flowing through a biasing coil.

20 Claims, 10 Drawing Sheets

(58) Field of Classification Search
USPC .......................................................... 310/28
See application file for complete search history.

(56) References Cited

U.S. PATENT DOCUMENTS

| | | | | |
|---|---|---|---|---|
| 8,860,337 | B2* | 10/2014 | Elenga | H02P 25/032 |
| | | | | 318/128 |
| 9,941,830 | B2* | 4/2018 | Elenga | H02K 33/16 |
| 2011/0018365 | A1* | 1/2011 | Kim | B06B 1/045 |
| | | | | 310/20 |
| 2014/0361714 | A1* | 12/2014 | Elenga | H02P 25/032 |
| | | | | 318/114 |
| 2015/0280537 | A1* | 10/2015 | Nishiura | H02K 33/12 |
| | | | | 310/25 |
| 2016/0226363 | A1 | 8/2016 | Mao et al. | |
| 2017/0093307 | A1* | 3/2017 | Mizuno | H02N 15/00 |
| 2017/0317568 | A1* | 11/2017 | Ishii | H02K 33/02 |
| 2017/0366077 | A1* | 12/2017 | Oonishi | H02J 50/00 |
| 2018/0367019 | A1 | 12/2018 | Takahashi et al. | |
| 2019/0044425 | A1* | 2/2019 | Zu | H02K 33/02 |

OTHER PUBLICATIONS

Written Opinion of the International Searching Authority issued for PCT/JP2020/005526, date of mailing May 12, 2020.

* cited by examiner

LINEAR VIBRATION MOTOR AND LINEAR VIBRATION SYSTEM

CROSS REFERENCE TO RELATED APPLICATIONS

The present application is a continuation of PCT/JP2020/005526 filed Feb. 13, 2020, which claims priority to Japanese Patent Application No. 2019-027436, filed Feb. 19, 2019, the entire contents of each of which are incorporated herein by reference.

TECHNICAL FIELD

The present invention relates to a linear vibration motor that vibrates a moving member by energizing a coil and to a linear vibration system using the linear vibration motor.

BACKGROUND

Currently, a linear vibration motor or actuator is provided that vibrates a moving member by using Lorentz force generated by an interaction between a magnetic field formed by an energized coil and a magnetic field formed by a permanent magnet. As an example, U.S. Patent Application Publication No. 2016/0226363 (hereinafter "Patent Document 1") proposes a linear vibration motor in which a moving member is biased in a vibration direction by a magnetic spring using a repulsive force generated between two permanent magnets.

In the linear vibration motor described in Patent Document 1, biasing by the magnetic spring generates resonance at a predetermined frequency, and this enables to obtain a strong vibration. However, a vibration with sufficient strength may not be obtained at frequencies other than the predetermined frequency (i.e., the resonant frequency) since a magnetic spring using a permanent magnet has a fixed spring constant. In order to generate vibrations with sufficient strength at various frequencies, it is necessary to use a plurality of linear vibration motors having resonant frequencies different from each other. This makes it hard to reduce the size of an apparatus.

SUMMARY OF THE INVENTION

Accordingly, it is an object of the present invention to provide a linear vibration motor constructed for generating vibrations with sufficient strength at various frequencies by using one motor and a linear vibration system using the linear vibration motor.

In an exemplary embodiment, a linear vibration motor is provided that includes a housing; a moving member accommodated in a space inside the housing; a drive unit including a driving coil disposed in the housing and a driving magnet attached to the moving member; and a bias unit including a biasing electromagnet having a core and a biasing coil and disposed in the housing, and a biasing magnet attached to the moving member.

In this exemplary aspect, the moving member vibrates in a first direction substantially orthogonal to a winding axis of the driving coil with Lorentz force generated by an interaction between a magnetic field formed by the driving coil energized and a magnetic field formed by the driving magnet. Moreover, the biasing electromagnet and the biasing magnet are disposed such that the same poles of the biasing electromagnet and the biasing magnet substantially face each other when the biasing electromagnet is energized, and the moving member is biased in the first direction by a magnetic spring resulted from a repulsive force generated between the biasing electromagnet energized and the biasing magnet. Furthermore, a magnetic spring constant of the magnetic spring varies with variation in a value of a current flowing through the biasing coil.

Moreover, in another exemplary aspect, a linear vibration system is provided that includes a linear vibration motor including a housing, a moving member accommodated in a space inside the housing, a drive unit including a driving coil disposed in the housing and a driving magnet attached to the moving member, and a bias unit including a biasing electromagnet having a core and a biasing coil and disposed in the housing, and a biasing magnet attached to the moving member; and an external circuit that energizes the driving coil and the biasing coil.

In this aspect, the moving member vibrates in a first direction substantially orthogonal to a winding axis of the driving coil with Lorentz force generated by an interaction between a magnetic field formed by the driving coil energized by the external circuit and a magnetic field formed by the driving magnet. Moreover, the biasing electromagnet and the biasing magnet are disposed such that the same poles of the biasing electromagnet and the biasing magnet substantially face each other when the biasing electromagnet is energized. The moving member is biased in the first direction by a magnetic spring resulted from a repulsive force generated between the biasing electromagnet energized by the external circuit and the biasing magnet, and a magnetic spring constant of the magnetic spring varies with variation in a value of a current flowing through the biasing coil.

According to exemplary aspects of the present invention, a linear vibration motor is provided that is configured for generating a vibration of various frequencies with sufficient strength by one motor and a linear vibration system using the linear vibration motor.

DETAILED DESCRIPTION OF EMBODIMENTS

Figure 1:
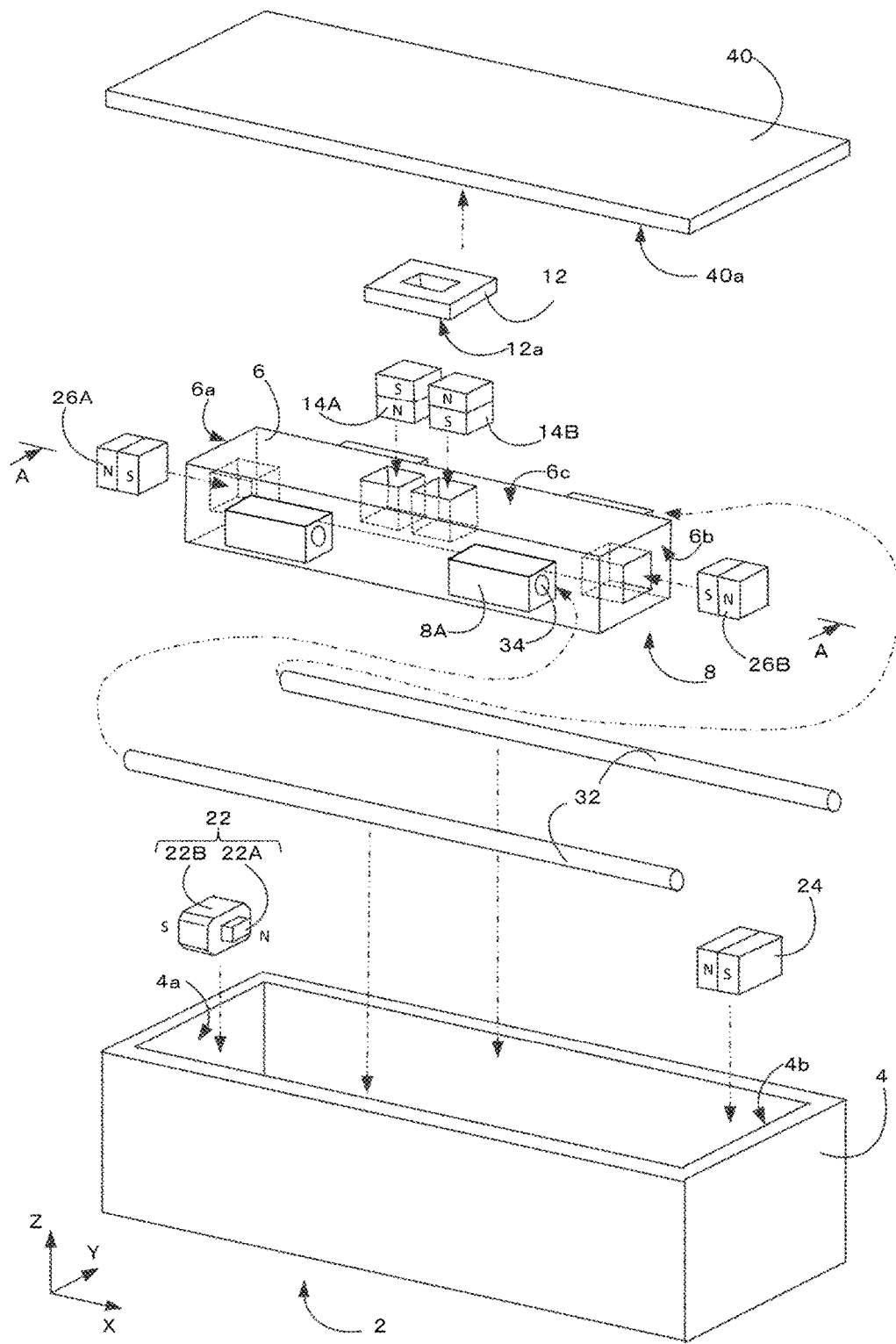
FIG. 1 is an exploded perspective view schematically illustrating the structure of a linear vibration motor according to a first exemplary embodiment.

Hereinafter, various exemplary embodiments and examples for implementing the present invention will be described with reference to the drawings. In the drawings, members having the same function and corresponding to each other are denoted by the same reference sign. Although the embodiments are separately described for convenience in consideration of the ease of the description or the understanding of main points, partial replacement or combination of configurations described in different embodiments is possible. The description of matters common to a first embodiment (first example) will be omitted in a second embodiment (second example) and thereafter, and only different points will be described. In particular, the same operation and advantages in the same configuration will not be described one by one for each subsequent exemplary embodiment.

In all the drawings, assuming a state in which a linear vibration motor is placed on a horizontal plane, a vibration direction of a moving member is defined as an X axis direction and a lateral direction orthogonal thereto is defined as a Y axis direction on the horizontal plane and a height direction orthogonal to the horizontal plane is defined as a Z axis direction. It is noted that the X axis direction, which is the vibration direction of the moving member, may be referred to as a first direction for purposes of this disclosure.

(Linear Vibration Motor According to First Embodiment)

Figure 2:
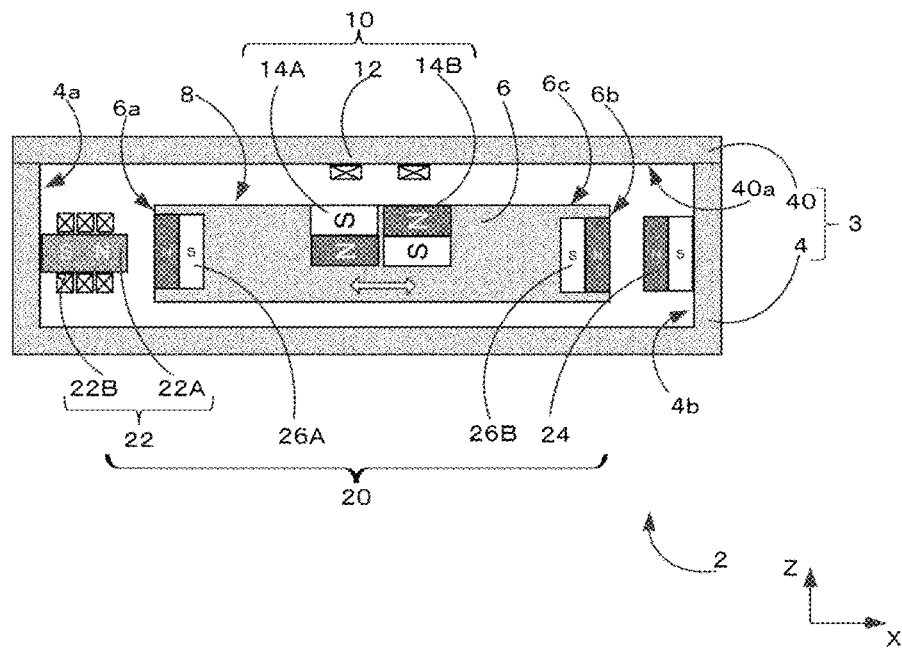
FIG. 2 is a side sectional view taken along line A-A of FIG. 1 and schematically illustrating the linear vibration motor according to the first exemplary embodiment.

First, a linear vibration motor according to a first exemplary embodiment will be described with reference to FIG. 1 and FIG. 2. FIG. 1 is an exploded perspective view schematically illustrating the structure of a linear vibration motor according to the first embodiment. FIG. 2 is a side sectional view taken along line A-A of FIG. 1 and schematically illustrating the linear vibration motor according to the first embodiment.

As shown, a linear vibration motor 2 according to the present embodiment includes a container 4, which has a box-shape and an upper portion of which is open, and a moving member 8 accommodated in a space inside the container 4. In this aspect, the container 4 has a substantially rectangular parallelepiped outer shape and an internal space and has a bottom plate and four side plates surrounding four sides of the bottom plate. A lid 40 for covering the space inside the container 4 is attached to the upper portion of the container 4. The container 4 and the lid 40 are made of a non-magnetic material, such as a resin material or the like. The container 4 and the lid 40 form a housing 3 (see FIG. 2). Being accommodated in the container 4 (or the space inside the container 4) covered with the lid 40, therefore, may be described as being accommodated in the housing 3 (or a space inside the housing 3).

A driving coil 12 is disposed above the moving member 8 in the container 4. In the present embodiment, the driving coil 12 is attached to an inner surface 40a of the lid 40. It is noted that the present invention is not limited thereto, and the driving coil 12 may be attached to a side of the container 4. The driving coil 12 is an air-core coil whose winding axis substantially extends in the Z axis direction. The driving coil 12 is disposed such that a lower end portion (e.g., one end portion) 12a thereof faces an upper surface (e.g., one surface) 6c of a main body 6 of the moving member 8. It is also noted that the container 4 is provided with an electrode and an energization path (not illustrated) for energizing the driving coil 12.

A biasing electromagnet 22 having a core 22A made of a ferromagnetic material and a biasing coil 22B wound around the core 22A is attached to a first inner side surface 4a of the container 4 in the X axis direction. A winding axis of the biasing coil 22B extends substantially in the X axis direction. The biasing electromagnet 22 is energized such that an end portion facing the first inner side surface 4a of the container 4 becomes an S pole and a side opposite thereto facing a first end surface 6a of the main body 6 of the moving member 8 becomes an N pole. Moreover, the container 4 is provided with an electrode and an energization path (not illustrated) for energizing the biasing electromagnet 22.

A housing-side magnet 24 is attached to a second inner side surface 4b (which can be opposite the first side surface 4a) of the container 4 in the X axis direction. The housing-side magnet 24 is disposed such that a line connecting the two poles substantially coincides with the X axis direction. The housing-side magnet 24 is disposed such that an end portion facing the second inner side surface 4b of the container 4 is an S pole and a side opposite thereto facing a second end surface 6b of the main body 6 of the moving member 8 is an N pole.

According to the exemplary aspect, the moving member 8 includes: a main body made of a non-magnetic material such as a resin material; and magnets, a bracket 8A, and the like attached to the main body 6. That is, the main body 6 corresponds to a structure portion or a frame portion of the moving member 8 to which magnets and the like are attached.

As further shown, two recesses are formed in the upper surface (one surface) 6c of the main body 6 of the moving member 8 to be arranged adjacent to each other in the X axis direction. Driving magnets 14A and 14B are disposed and fixed in the respective two recesses. Each of the driving magnets 14A and 14B is disposed at a position such that the direction connecting the two poles substantially coincides with the winding axis direction (substantially Z axis direction) of the driving coil 12 and one of the two poles exposed at the upper surface (one surface) 6c faces the winding in the lower end portion (one end portion) 12a of the driving coil 12. In more detail, the driving magnet 14A disposed on the left side of the drawing in FIG. 2 has an S pole exposed at the upper surface (one surface) 6c and is disposed at a position facing the winding of the driving coil 12 positioned on the left side of the drawing. Whereas, the driving magnet 14B disposed on the right side of the drawing in FIG. 2 has an N pole exposed at the upper surface (one surface) 6c and is disposed at a position facing the winding of the driving coil 12 positioned on the right side of the drawing. It is noted that the S pole or the N pole may not be exposed and may be covered with the main body 6 of the moving member 8 in exemplary aspects.

As further shown, recesses are formed at both end portions of the moving member 8 in the X axis direction. Biasing magnets 26A and 26B are disposed and fixed in the respective recesses. In more detail, the biasing magnet 26A disposed on the left side of the drawing in FIG. 2 is disposed such that a line connecting the two poles thereof substantially coincides with a direction of the winding axis (substantially X axis direction) of the biasing coil 22B and the N pole faces an end portion (N pole in energization) of the biasing electromagnet 22. The biasing magnet 26B disposed on the right side of the drawing in FIG. 2 is disposed such that a line connecting the two poles thereof substantially coincides with a line connecting the two poles (substantially X axis direction) of the housing-side magnet 24 and the N pole faces an end portion (N pole) of the housing-side magnet 24.

As illustrated in FIG. 1, two brackets 8A are joined to each of the two side surfaces of the main body 6 in the Y axis direction. The two brackets 8A are disposed adjacent to each other in the X axis direction on each side surface. The bracket 8A has a bore portion 34 whose axial direction is substantially the X axis direction, and the central axes of the bore portions 34 in the two brackets 8A on the same side surface substantially coincide with each other.

As further shown, two shafts 32 are disposed in the space inside the container 4 so as to extend substantially in the X axis direction. Each of the two shafts 32 is inserted into the bore portions 34 in the brackets 8A disposed adjacent to each other. Both end portions of the shaft 32 are fixed to the inner side surfaces 4a and 4b on both sides of the container 4 in the X axis direction.

The bore portion 34 in the bracket 8A has a contact surface in contact with an outer surface of the shaft 32 to allow movement. With this configuration, the moving member 8 is configured and able to move substantially in the X axis direction in the space inside the container 4 with the shafts 32 disposed on both sides as support members. As described below, the moving member 8 vibrates substantially in the X axis direction, which is the axial direction of the shaft 32, by a drive unit 10 including the driving coil 12 and the driving magnets 14A and 14B. A movement support mechanism including the shaft 32 and the bore portion 34, as illustrated in FIG. 1, makes it possible for the moving member 8 to be reliably and stably vibrated substantially in the X axis direction.

<Drive Unit 10>

Next, the drive unit 10 including the driving coil 12 disposed in the container 4 (i.e., the housing 3) and the driving magnets 14A and 14B attached to the moving member 8 will be described.

When a current is supplied to the driving coil 12, a magnetic field is formed. Lorentz force is generated by an interaction between a magnetic field formed by the driving coil 12 and magnetic fields formed by the driving magnets 14A and 14B. Since the winding axis of the driving coil 12 and the lines connecting the two poles of the driving magnets 14A and 14B extend substantially in the Z axis direction (see FIG. 2), Lorentz force is generated substantially in the X axis direction substantially orthogonal to the winding axis of the driving coil 12 according to Fleming's left-hand rule.

In the energized driving coil 12, the direction of the generated magnetic field in the region of the winding positioned on the left side of the drawing in FIG. 2 and the direction of the generated magnetic field in the region of the winding positioned on the right side of the drawing in FIG. 2 are opposite to each other. Since the polarities of the driving magnets 14A and 14B facing the respective windings are opposite to each other, Lorentz forces are generated in the same direction substantially in the X axis direction. Since the driving coil 12 is fixed to a side of the housing 3 (e.g., the lid 40) and the driving magnets 14A and 14B are attached to a side of the moving member 8, the moving member 8 moves substantially in the X axis direction by Lorentz force.

At this time, alternately supplying DC currents in reverse directions at a predetermined frequency or supplying an AC current to the driving coil 12 makes the moving member 8 vibrate substantially in the X axis direction. By energizing the driving coil 12 in this manner, the moving member 8 can reliably be vibrated. At this time, since the driving coil 12 is disposed above (e.g., lateral side in the Z axis direction orthogonal to the X axis) the main body 6 of the moving member 8 to be vibrated substantially in the X axis direction (first direction), it is possible to obtain the drive unit 10 that applies a sufficient driving force while suppressing the overall length of a device in the X axis direction (first direction).

<Bias Unit 20>

Next, a bias unit 20 including the biasing electromagnet 22 attached to the container 4, the biasing magnet 26A attached to the moving member 8, the housing-side magnet 24 attached to the container 4, and the biasing magnet 26B attached to the moving member 8 will be described. It is noted that, of the bias unit, the biasing electromagnet 22 and the biasing magnet 26A may be referred to as a "first bias unit" and the housing-side magnet 24 and the biasing magnet 26B may be referred to as a "second bias unit" for purposes of this disclosure.

In the present embodiment, in particular, the first bias unit and the second bias unit are disposed so as to overlap with the main body 6 of the moving member 8 when viewed from the X axis direction. That is, in FIG. 2, the first bias unit is disposed on the left side of the drawing of the main body 6 of the moving member 8, and the second bias unit is disposed on the right side of the drawing of the main body 6 of the moving member 8. With the arrangement above, biasing forces may be applied from both sides in the X axis direction to the main body 6 of the moving member 8 to be vibrated substantially in the X axis direction.

It is noted that the present invention is not limited thereto. For example, in the first bias unit and the second bias unit, the biasing magnets 26A and 26B can protrude from the main body 6 to a lateral side in the Y axis direction or the Z axis direction orthogonal to the X axis direction. In response to this, the positions of the biasing electromagnet 22 and the housing-side magnet 24 can also be moved so as to dispose the first bias unit and the second bias unit on the lateral side of the main body 6.

The biasing electromagnet 22 and the biasing magnet 26A of the first bias unit are disposed such that the N poles of the same polarity face each other when the biasing electromagnet 22 is energized. By energizing the biasing electromagnet 22, therefore, a repulsive force is generated in accordance with the distance between the biasing electromagnet 22 and the biasing magnet 26A. Similarly, since the housing-side magnet 24 and the biasing magnet 26B are also disposed such that the N poles of the same polarity face each other, a repulsive force is generated in accordance with the distance between the housing-side magnet 24 and the biasing magnet 26B. With the repulsive force between the electromagnet and the magnet and between the magnet and the magnet described above, the first bias unit and the second bias unit function as a magnetic spring. The direction in which the magnetic spring of the first bias unit biases the moving member 8 is opposite to the direction in which the magnetic spring of the second bias unit biases the moving member 8. As will be described later, in such a minute moving distance that resonance occurs, the magnetic spring resulted from the repulsive force between the electromagnet and the magnet or between the magnet and the magnet may linearly be approximated.

Figure 3:
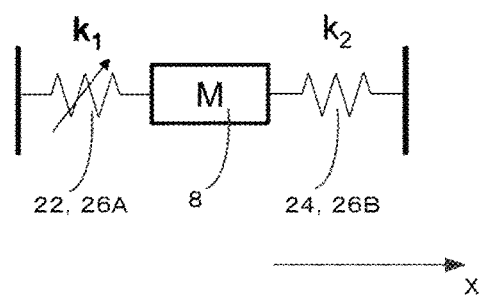
FIG. 3 is a diagram schematically illustrating a magnetic spring of the linear vibration motor according to the first exemplary embodiment.

As described above, the bias unit 20 of the linear vibration motor according to the first embodiment can be schematically illustrated as in FIG. 3. FIG. 3 is a diagram schematically illustrating a magnetic spring of the linear vibration motor according to the first embodiment. In the model illustrated in FIG. 3, the moving member 8 having a mass M is biased from the left side to the right side of the drawing in the X axis direction by a variable spring having a spring constant k1 and including the biasing electromagnet 22 and the biasing magnet 26A. Whereas, the moving member 8 is biased from the right side to the left side of the drawing in the X axis direction by a stationary spring having a spring constant k2 and including the housing-side magnet 24 and the biasing magnet 26B.

At this time, in a case that the moving member 8 is vibrated in the X axis direction by the drive unit 10 including the driving coil 12 and the driving magnets 14A and 14B, when the frequency of the vibration reaches an natural frequency determined by the mass M and the spring constants k1 and k2, the vibration is amplified and resonance with a strong vibration occurs.

When it is assumed that the moving member 8 is biased only by the stationary spring, the resonance only occurs at a predetermined frequency. Whereas, in the present embodiment, the spring constant k1 of the variable spring including the biasing electromagnet 22 and the biasing magnet 26A can be varied by varying the value of the current flowing through the biasing coil 22B of the biasing electromagnet 22. This configuration makes it possible to vary the natural frequency at which the resonance occurs.

Figure 4:
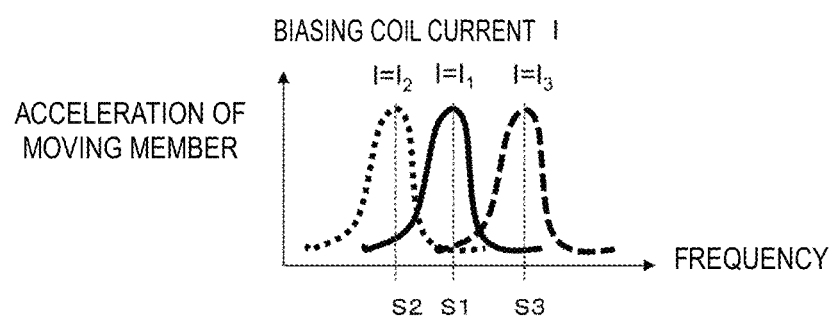
FIG. 4 is a graph illustrating that resonance occurs at different frequencies in accordance with a current flowing through a biasing coil.

This will be described in more detail with reference to FIG. 4. FIG. 4 is a graph illustrating that resonance occurs at different frequencies depending on a current flowing through the driving coil 12. In FIG. 4, the vertical axis represents the acceleration of the moving member 8, and the horizontal axis represents the frequency of vibration.

The following is identified in the graph. When a current of a value $I_1$ flows through the driving coil 12, resonance occurs at a frequency S1 (150 Hz, for example). When a current of a value $I_2$ smaller than the current of the value $I_1$ flows through the driving coil 12, the magnetic spring constant becomes small, and resonance occurs at a frequency S2 (100 Hz, for example) lower than the frequency S1. When a current of a value $I_3$ larger than the current of the value $I_1$ flows through the driving coil 12, the magnetic spring constant becomes large, and resonance occurs at a frequency S3 (200 Hz, for example) higher than the frequency S1.

As described above, when the moving member 8 is vibrated in the X axis direction (first direction) by the drive unit 10, the moving member 8 is biased by the magnetic spring having the first bias unit including the biasing electromagnet 22 and the biasing magnet 26A and the second bias unit including the housing-side magnet 24 and the biasing magnet 26B. This configuration makes the moving member resonate in a predetermined frequency. Since the spring constant k1 of the magnetic spring may be varied by varying the value of the current flowing through the biasing coil 22B, the resonant frequency of the moving member 8 may be varied. Thus, the linear vibration motor 2 is provided that is configured for generating a vibration of various frequencies with sufficient strength by one linear vibration motor.

In the first embodiment, the first bias unit including the biasing electromagnet 22 and the biasing magnet 26A and the second bias unit including the housing-side magnet 24 and the biasing magnet 26B can be individually disposed. This configuration allows various designs and arrangements to be achieved. In particular, in a case that the first bias unit and the second bias unit are disposed so as to overlap with the main body 6 of the moving member 8 when viewed from the X axis direction, the position where the biasing force is directly applied overlaps with the main body 6 of the moving member 8, and thus a stable vibration characteristic may be obtained.

When the value of the current flowing through the biasing coil 22B varies, the magnetic spring constant k1 of the first bias unit varies and the repulsive force of the first bias unit varies, and a vibration occurs with a position where the repulsive force of the first bias unit and the repulsive force of the second bias unit are balanced as a vibration center. That is, varying the magnetic spring constant k1 of the first bias unit may vary the vibration center of the moving member 8 in the X direction.

(Linear Vibration Motor According to Second Embodiment)

Figure 5:
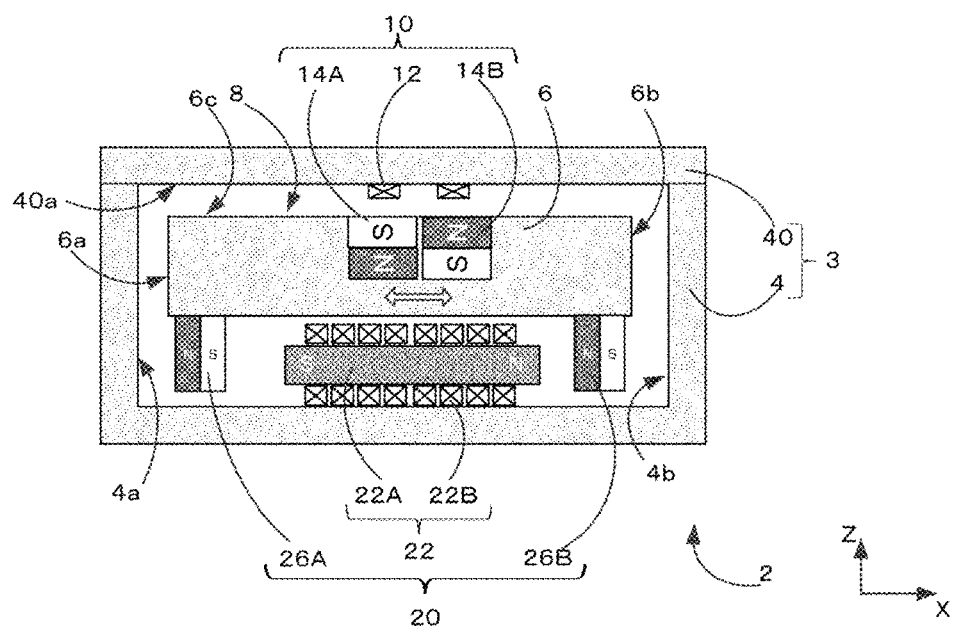
FIG. 5 is a side sectional view schematically illustrating a linear vibration motor according to a second exemplary embodiment.

Next, a linear vibration motor according to a second exemplary embodiment will be described with reference to FIG. 5. FIG. 5 is a side sectional view schematically illustrating a linear vibration motor according to the second embodiment. FIG. 5 corresponds to a side sectional view taken along line A-A in FIG. 1 similarly to FIG. 2.

The second embodiment is different from the first embodiment in the structure and the attachment position of the bias unit 20. It is noted that the structure of the container 4 and the lid 40 and the drive unit 10 including the driving coil 12 and the driving magnets 14A and 14B are basically similar to those in the first embodiment described above.

<Bias Unit 20>

In the linear vibration motor 2 according to the present embodiment, when viewed from the X axis direction, the winding axis of the biasing coil 22B wound around the core 22A of the biasing electromagnet 22 is arranged so as not to overlap with the main body 6 of the moving member 8. In more detail, when viewed from the X axis direction, the winding axis of the biasing coil 22B is arranged so as to overlap with the biasing magnets 26A and 26B protruding from the main body 6 of the moving member 8 in a direction substantially orthogonal to the X axis direction (lower side of the main body 6 in the Z axis direction in FIG. 5). In the X axis direction, the biasing electromagnet 22 is disposed between the two biasing magnets 26A and 26B.

In FIG. 5, the biasing magnets 26A and 26B protrude to the lower side of the main body 6 of the moving member 8 which is in the Z axis direction, but the present embodiment is not limited thereto. As long as a direction is substantially orthogonal to the X axis direction, the biasing magnets 26A and 26B can be provided to protrude in the direction. For example, the biasing magnets 26A and 26B can be provided to protrude to the lateral side of the main body 6 of the moving member 8 in the Y axis direction.

With respect to the polarity of the bias unit 20, the biasing magnet 26A on the left side of the drawing in the X axis direction is disposed such that the S pole faces an end portion of the core 22A of the biasing electromagnet 22. Whereas, the biasing magnet 26B on the right side of the drawing in the X axis direction is disposed such that the N pole faces an end portion of the core 22A of the biasing electromagnet 22.

Here, when a current flows through the biasing coil 22B of the biasing electromagnet 22 such that the end portion on the left side of the drawing becomes the S pole and the end portion on the right side of the drawing becomes the N pole, a repulsive force occurs between the end portion on the left side of the biasing electromagnet 22 and the biasing magnet 26A to function as a magnetic spring, and a repulsive force occurs between the end portion on the right side of the biasing electromagnet 22 and the biasing magnet 26B to function as a magnetic spring.

Figure 7:
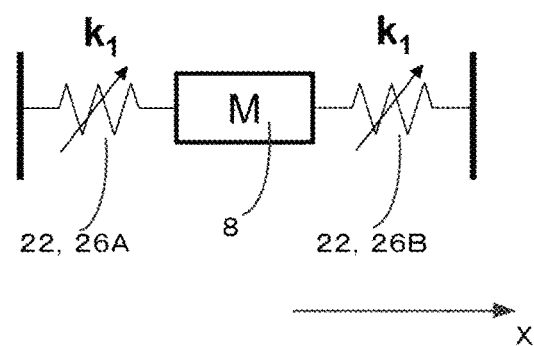
FIG. 7 is a diagram schematically illustrating a magnetic spring of the linear vibration motor according to the second or third exemplary embodiment.

The bias unit 20 of the linear vibration motor 2 according to the second embodiment as described above may schematically be illustrated as in FIG. 7. FIG. 7 is a diagram schematically illustrating the magnetic spring of the linear vibration motor according to the second embodiment or a third embodiment described later of the present invention. In the model illustrated in FIG. 7, the moving member 8 having the mass M is biased from the left side to the right side of the drawing in the X axis direction by the variable spring having the spring constant k1 and including the biasing electromagnet 22 and the biasing magnet 26A, while the moving member 8 having the mass M is biased from the right side to the left side of the drawing in the X axis direction by the variable spring having the spring constant k1 and including the biasing electromagnet 22 and the biasing magnet 26B. That is, in the present embodiment, the forces of the variable springs having the same spring constant k1 are applied from both sides to the moving member 8 having the mass M.

Varying the value of the current flowing through the biasing coil 22B of the biasing electromagnet 22 may vary the spring constant k1 of the variable springs including the biasing electromagnet 22 and the biasing magnets 26A and 26B. This configuration makes it possible to vary the natural frequency at which the resonance occurs. With this, also in the second embodiment, as illustrated in the graph of FIG. 4, the resonant frequency of the moving member 8 may be varied by varying the value of the current flowing through the biasing coil 22B. Thus, the linear vibration motor 2 of small size is provided that is configured for generating a vibration of various frequencies with sufficient strength by one device.

In the second embodiment, when viewed from the X axis direction (first direction), the winding axis of the biasing coil 22B does not overlap with the main body 6 of the moving member 8, and therefore, the biasing coil 22 may be disposed in a lateral side region (e.g., lower side in FIG. 5) of the main body 6 in the direction orthogonal to the X axis. Thus, a sufficient biasing force may be obtained while suppressing the entire length of the linear vibration motor 2 in the X axis direction. Further, the length (i.e., winding axis length) of the biasing coil 22 may be increased as necessary.

In particular, when viewed from the X axis direction (first direction), the winding axis of the biasing coil 22B is arranged so as to overlap with the biasing magnets 26A and 26B protruding from the main body 6 of the moving member 8. This configuration makes it possible to reliably obtain a sufficient biasing force while suppressing the entire length of the linear vibration motor 2 in the X axis direction.

Further, since the biasing coil 22B is disposed between the two biasing magnets 26A and 26B in the lateral side region of the main body 6 of the moving member 8, the entire length of the linear vibration motor 2 in the X axis direction (first direction) can sufficiently be shortened.

(Linear Vibration Motor According to Third Embodiment)

Figure 6:
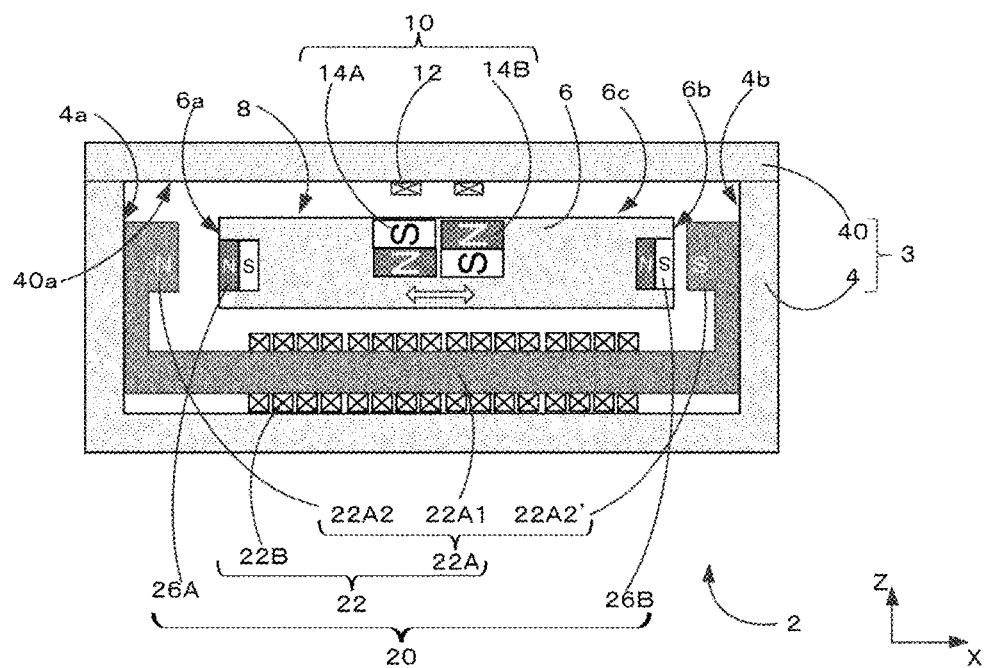
FIG. 6 is a side sectional view schematically illustrating a linear vibration motor according to a third exemplary embodiment.

Next, a linear vibration motor according to a third exemplary embodiment of the present invention will be described with reference to FIG. 6. FIG. 6 is a side sectional view schematically illustrating the linear vibration motor according to the third embodiment. FIG. 6 corresponds to a side sectional view taken along line A-A in FIG. 1 similarly to FIG. 2.

The third embodiment is similar to the above-described second embodiment in that the winding axis of the biasing coil 22B is arranged so as not to overlap with the main body 6 of the moving member 8 when viewed from the X axis direction. However, the detailed structure and the attachment position of the bias unit 20 are different from those in the second embodiment. Note that the structure of the container 4 and the lid 40 and the drive unit 10 including the driving coil 12 and the driving magnets 14A and 14B are basically similar to those in the first and second embodiments described above.

<Bias Unit 20>

In the linear vibration motor 2 according to the present embodiment, similarly to the second embodiment described above, when viewed from the X axis direction, the winding axis of the biasing coil 22B wound around the core 22A of the biasing electromagnet 22 is arranged so as not to overlap with the main body 6 of the moving member 8. However, the third embodiment is different from the above-described second embodiment as follows. In the longitudinal direction of the core 22A of the biasing electromagnet 22, two end regions 22A2 and 22A2' overlapping with the main body 6 of the moving member 8 when viewed from the X axis direction are provided on both sides of an intermediate region 22A1 around which the biasing coil 22B is wound.

Accordingly, the biasing magnet 26A and the biasing magnet 26B are attached to both ends of the main body 6 of the moving member 8 in the X axis direction. The two end regions 22A2 and 22A2' of the core 22A of the biasing electromagnet 22 are arranged so as to face the biasing magnets 26A and 26B disposed at the both ends of the main body 6 of the moving member 8, respectively. In more detail, the biasing magnet 26A disposed at an end portion of the main body 6 of the moving member 8 on the left side of the drawing is disposed such that the N pole thereof faces the end region 22A2 of the core 22A of the biasing electromagnet 22. Whereas, the biasing magnet 26B disposed at an end portion of the main body 6 of the moving member 8 on the right side of the drawing is disposed such that the S pole thereof faces the end region 22A2' of the core 22A of the biasing electromagnet 22.

Here, when a current flows through the biasing coil 22B of the biasing electromagnet 22 such that the end region 22A2 becomes the N pole and the end region 22A2' becomes the S pole, a repulsive force occurs between the end region 22A2 of the biasing electromagnet 22 and the biasing magnet 26A to function as a magnetic spring. Similarly, a repulsive force occurs between the end region 22A2' of the biasing electromagnet 22 and the biasing magnet 26B to function as a magnetic spring.

The bias unit 20 of the linear vibration motor 2 according to the third embodiment as described above may schematically be illustrated as in FIG. 7 similarly to the second embodiment. That is, also in the third embodiment, the forces of the variable springs having the same spring constant k1 are applied from both sides to the moving member 8 having the mass M.

Thus, varying the value of the current flowing through the biasing coil 22B of the biasing electromagnet 22 may vary the spring constant k1 of the variable springs including the biasing electromagnet 22 and the biasing magnets 26A and 26B. This configuration makes it possible to vary the natural frequency at which the resonance occurs. With this, also in the third embodiment, as illustrated in the graph of FIG. 4, the resonant frequency of the moving member 8 may be varied by varying the value of the current flowing through the biasing coil 22B. Thus, the linear vibration motor 2 can be provided that is configured for generating a vibration of various frequencies with sufficient strength by one linear vibration motor.

In the third embodiment, since the biasing magnets 26A and 26B do not exist in the lateral side region of the main body 6 of the moving member 8, a large winding space for the biasing coil 22B may be ensured. This configuration makes it possible to increase a coil length and a winding axis length. In some cases, it is also possible to dispose the biasing coil 22B having a winding axis length approximately equal to the length of the main body 6 of the moving member 8 in the X axis direction. As a result, the biasing coil 22B having a long winding axis length may be disposed, and therefore, it is possible to apply a larger biasing force or to lower the value of the current flowing through the biasing coil 22B necessary for obtaining the same repulsive force of the magnetic spring. Further, since the positions of the end regions 22A2 and 22A2' of the core 22A of the biasing electromagnet 22 to which the biasing force is applied overlap with the main body 6 of the moving member 8 when viewed from the X axis direction (first direction), a stable vibration characteristic may be obtained.

In FIG. 6, the core 22A is formed in a substantially U-shape (U-shape in which a bent region is a right angle) when viewed from the Y axis direction, but the present invention is not limited thereto. Any shape including a substantially C-shape and a substantially U-shape may be adopted as long as the core 22A has the shape in which the end regions 22A2 and A2' overlap with the main body 6 on both sides in the longitudinal direction (or both sides in first direction) of the intermediate region 22A1 of the core 22A, around which the biasing coil 22B is wound and which does not overlap with the main body 6 of the moving member 8.

(Linear Approximation of Magnetic Spring)

Figure 8:
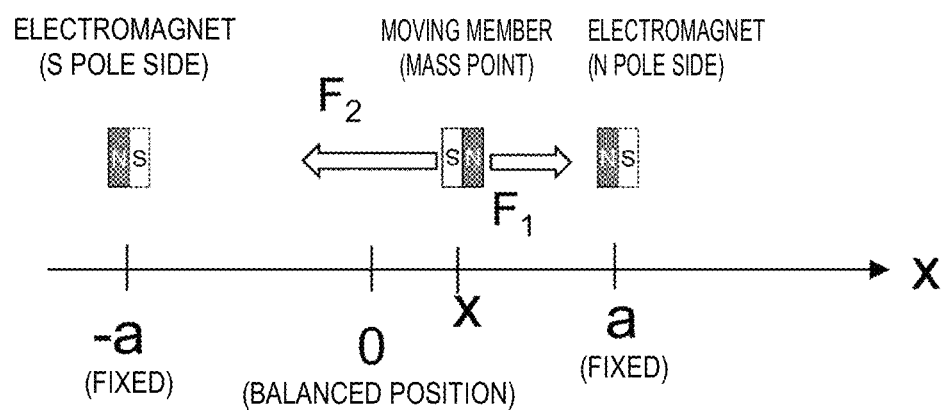
FIG. 8 is a schematic diagram for explaining linear approximation of a magnetic spring.

As described above, in such a minute moving distance that resonance occurs, the magnetic spring resulted from the repulsive force between the electromagnet and the magnet or between the magnet and the magnet may linearly be approximated. Next, the linear approximation of the magnetic spring will be described in more detail with reference to FIG. 8. FIG. 8 is a schematic diagram for explaining the linear approximation of a magnetic spring. Here, for an example, a case that the forces of variable springs having the same spring constant k1 are applied from both sides to the moving member 8 having the mass M as in FIG. 7 will be described. It is noted that, also in a case that a variable spring having a spring constant k1 and a stationary spring having a spring constant k2 are used as in FIG. 4, linear approximation is similarly possible at a position where the repulsive forces of the both springs are balanced.

The following equation 1 holds from the equation of motion of the moving member (e.g., a mass point) with the model in FIG. 8, when the mass of the moving member is M, the repulsive force between the S pole side of the biasing electromagnet on the housing side and the S pole of the biasing magnet on the moving member side is $F_1$, the repulsive force between the N pole side of the biasing electromagnet on the housing side and the N pole of the biasing magnet on the moving member side is $F_2$, the magnetic charge of the biasing magnet on the moving member side is $m_0$, the magnetic charge of the biasing electromagnet on the housing side is $m_1$, and the proportionality constant is $k_m$. Further, since the repulsive forces $F_1$ and $F_2$ may be expressed as Equation 2, Equation 3 is obtained from Equation 1 and Equation 2.

$$M\frac{d^2x}{dt^2} = F_1 - F_2 \qquad \text{(Equation 1)}$$

$$F_1 = k_m\frac{m_0 m_1}{(a+x)^2} \qquad \text{(Equation 2)}$$

$$F_2 = k_m\frac{m_0 m_1}{(a-x)^2}$$

$$M\frac{d^2x}{dt^2} = \frac{m_0 m_1 k_m}{a^2}\left\{\frac{1}{\left(1+\frac{x}{a}\right)^2} - \frac{1}{\left(1-\frac{x}{a}\right)^2}\right\} \qquad \text{(Equation 3)}$$

Assuming that the moving member vibrates in a range sufficiently smaller than the distance from the biasing electromagnet leads to a relation x<<a, and therefore, Equation 3 may be approximated as the following Equation 4.

$$M\frac{d^2x}{dt^2} = \frac{m_0 m_1 k_m}{a^2}\left\{\left(1-\frac{2x}{a}\right)-\left(1+\frac{2x}{a}\right)\right\} = -\frac{4m_0 m_1 k_n}{a^3}x \qquad \text{(Equation 4)}$$

When "k" is defined as Equation 5 below, "k" corresponds to the spring constant of the magnetic spring and may be expressed as Equation 6. Thus, the magnetic spring can linearly be approximated as a linear spring having a spring constant k.

$$k = \frac{4m_0 m_1 k_m}{a^3} \qquad \text{(Equation 5)}$$

$$M\frac{d^2x}{dt^2} = -kx \qquad \text{(Equation 6)}$$

Since the value of the current flowing through the biasing electromagnet and the magnetic charge $m_1$ of the biasing electromagnet have a positive correlation, it can be seen from Equation 5 that the value of the current flowing through the biasing electromagnet and the spring constant k of the magnetic spring have a positive correlation. Assuming that the natural frequency (e.g., the resonant frequency) of the magnetic spring system is ω, the following Equation 7 and Equation 8 hold.

Since the value of the current flowing through the biasing electromagnet and the magnetic charge $m_1$ of the biasing electromagnet have a positive correlation, it can be seen from Equation 8 that the value of the current flowing through the biasing electromagnet and the resonant frequency ω have a positive correlation. Thus, as illustrated in the graph of FIG. 4, when the value of the current flowing through the biasing electromagnet is increased, for example, the resonant frequency ω increases. The resonant frequency ω may be calculated by using the correlation function between the value of the current flowing through the biasing electromagnet and the magnetic charge $m_1$ of the biasing electromagnet.

$$\frac{d^2x}{dt^2} = -\omega^2 x \qquad \text{(Equation 7)}$$

$$\omega = 2\sqrt{\frac{m_0 m_1 k_m}{M a^3}} \qquad \text{(Equation 8)}$$

(Linear Vibration System According to Embodiment)

Figure 9:
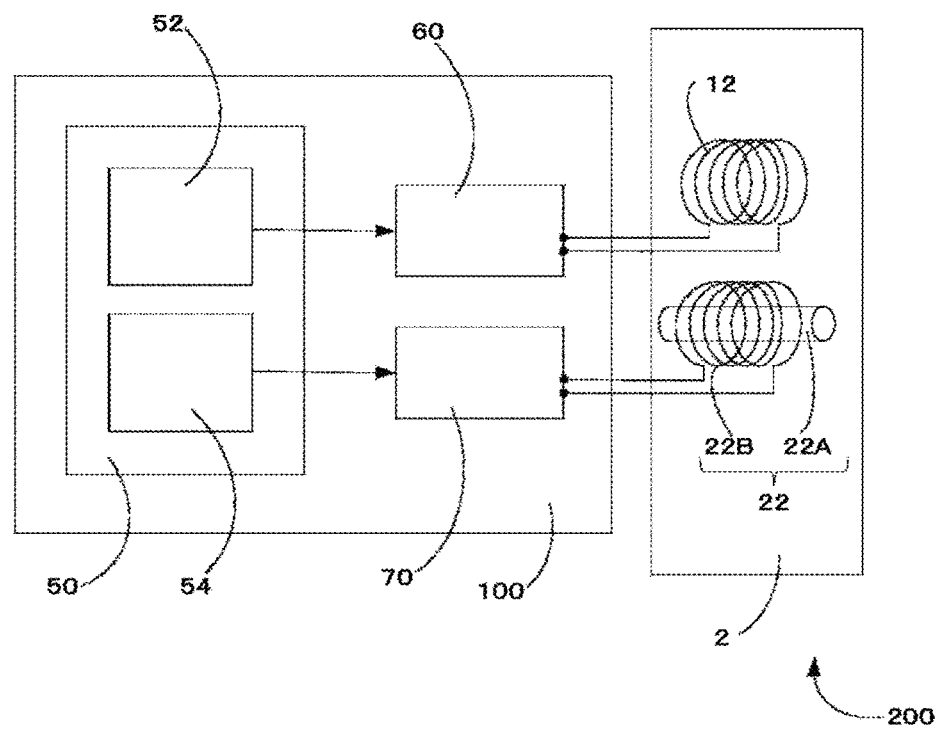
FIG. 9 is a block diagram of a linear vibration system according to an exemplary embodiment.

Next, a linear vibration system according to an exemplary embodiment will be described with reference to FIG. 9. FIG. 9 is a block diagram of a linear vibration system according to the embodiment of the present invention.

The linear vibration system 200 according to the present embodiment includes the linear vibration motor 2 according to any of the embodiments described above and an external circuit 100 for energizing the driving coil 12 and the biasing coil 22B of the biasing electromagnet 22 included in the linear vibration motor 2.

The external circuit 100 includes a driving coil driver 60 for supplying a current to the driving coil 12, a biasing coil driver 70 for supplying a current to the biasing coil 22B, and a controller 50 for controlling the driving coil driver 60 and the biasing coil driver 70. The controller 50 includes a first controller 52 for controlling the value of the current supplied from the driving coil driver 60 to the driving coil 12, and a second controller 54 for controlling the value of the current supplied from the biasing coil driver 70 to the biasing coil 22B.

Figure 10:
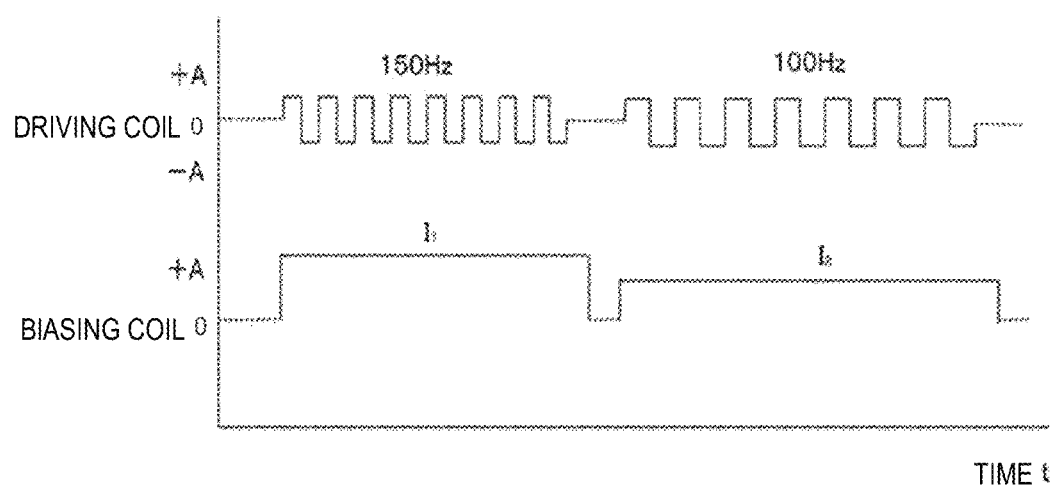
FIG. 10 is a time chart illustrating an example of a supply pattern of a current to a driving coil and a biasing coil in the linear vibration system in FIG. 9.

Next, the current supplied to the driving coil 12 controlled by the first controller 52 and the current supplied to the biasing coil 22B controlled by the second controller 54 will be described with reference to FIG. 10. FIG. 10 is a time chart illustrating an example of a supply pattern of a current to the driving coil and the biasing coil in the linear vibration system in FIG. 9. In FIG. 10, the horizontal axis represents time, and the vertical axis represents a current value (A). With respect to 0, the upper side indicates plus and the lower side indicates minus.

The example in FIG. 9 illustrates a case in which DC currents in reverse directions are alternately supplied to the driving coil 12 by the first controller 52. For example, with a pulse width modulation (PWM) control, each of the positive current and the negative current may be outputted by the control alternately repeating on and off.

Illustrated is a case that positive and negative pulse currents in a frequency of 150 Hz are supplied first and positive and negative pulse currents in a frequency of 100 Hz are supplied next. As a result, the moving member 8 is vibrated in the frequency of 150 Hz and then is vibrated in the frequency of 100 Hz. The frequency of 150 Hz corresponds to S1 in the graph of FIG. 4, and the frequency of 100 Hz corresponds to S2 in the graph of FIG. 4.

Illustrated is a case that while the pulse current is supplied to the driving coil 12 in the frequency of 150 Hz (=S1), the second controller 54 controls to supply a current of the current value $I_1$, which corresponds to a magnetic spring constant for generating resonance at 150 Hz (=S1), to the biasing coil 22B. After that, illustrated is a case that while the pulse current is supplied to the driving coil 12 in the frequency of 100 Hz (=S2), the second controller 54 controls to supply a current of the current value $I_2$, which corresponds to a magnetic spring constant for generating resonance at 100 Hz (=S2), to the biasing coil 22B.

By the control as described above, a linear vibration system can be provided that includes the linear vibration motor 2 configured for applying a vibration of various frequencies by one motor. In particular, appropriately controlling the current supplied to the driving coil 12 and the biasing coil 22B by the first controller 52 and the second controller 54 makes it possible to reliably apply a vibration of various frequencies by one linear vibration motor.

(Linear Vibration System According to Another Embodiment)

Figure 11:
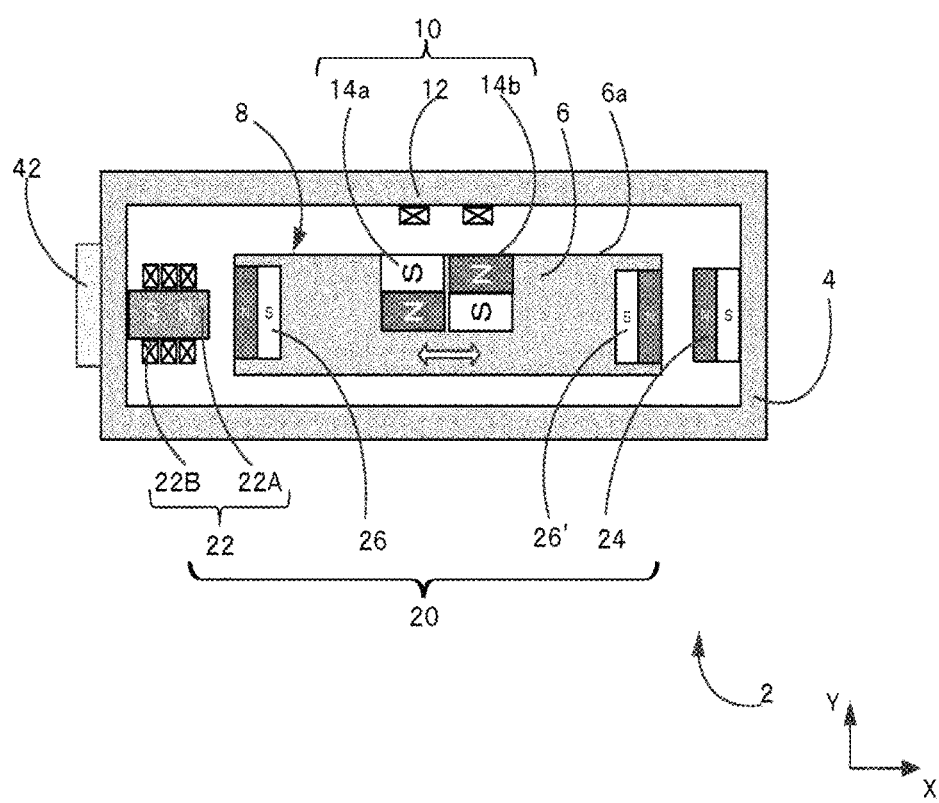
FIG. 11 is a side sectional view schematically illustrating a linear vibration motor according to a fourth exemplary embodiment.
Figure 12A:
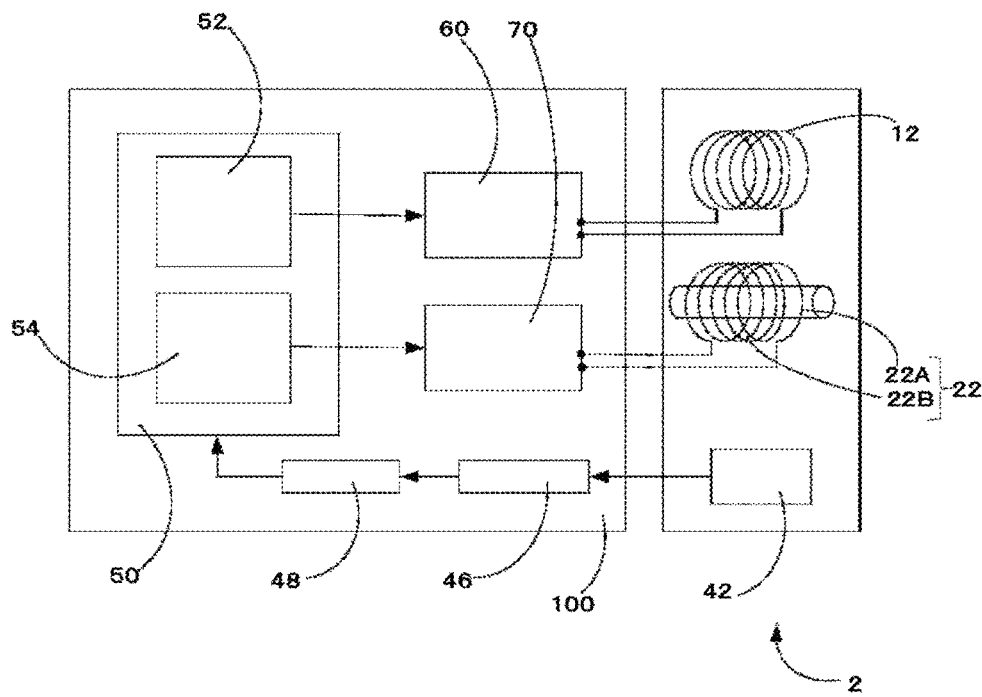
FIG. 12A is a block diagram of a linear vibration system according to an exemplary embodiment.
Figure 12B:
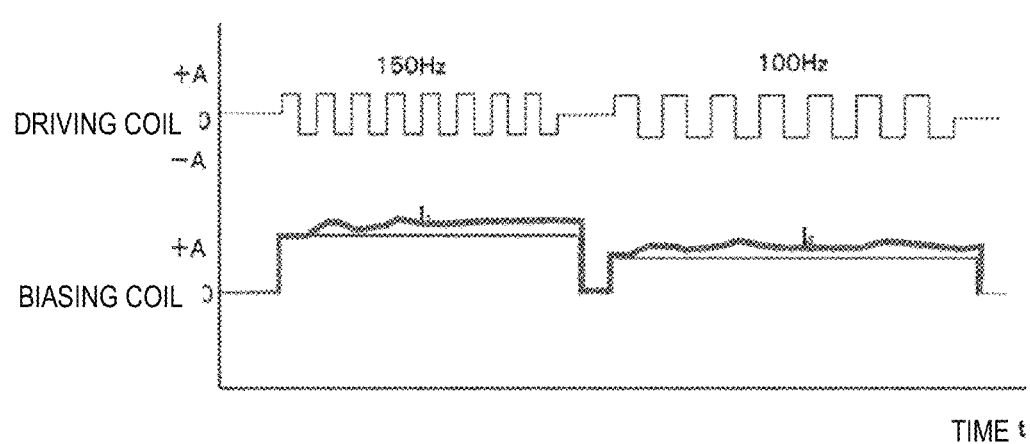
FIG. 12B is a time chart illustrating an example of a supply pattern of a current to a driving coil and a biasing coil in the linear vibration system in FIG. 12A.

Next, a linear vibration motor according to a fourth exemplary embodiment and a linear vibration system according to an additional embodiment including the linear vibration motor will be described with reference to FIG. 11, FIG. 12A, and FIG. 12B. FIG. 11 is a side sectional view schematically illustrating a linear vibration motor according to the fourth embodiment. FIG. 12A is a block diagram of a linear vibration system according to the additional embodiment. FIG. 12B is a time chart illustrating an example of a supply pattern of a current to the driving coil and the biasing coil in the linear vibration system in FIG. 12A. The vertical and horizontal axes of the time chart in FIG. 12B are the same as those of the time chart in FIG. 10.

In the linear vibration motor 2 according to the fourth embodiment, a vibration sensor 42 is attached to the container 4. Here, for example, illustrated is a case that the vibration sensor 42 is provided to the linear vibration motor according to the first embodiment described above. Note that the configuration is not limited thereto, and the vibration sensor 42 may be provided to the linear vibration motor according to the second or third embodiment, for example.

While a feedforward control is performed in the linear vibration system according to the embodiment in FIG. 9 described above, a feedback control based on a signal from the vibration sensor 42 is performed in the linear vibration system according to the present embodiment in FIG. 12A.

The vibration sensor 42 provided to the linear vibration motor 2 detects the actual vibration of the linear vibration motor 2 and transmits the vibration waveform to the controller 50 in the form of an electric signal. As the vibration sensor 42, an acceleration sensor may be used, for example. As illustrated in FIG. 12, for example, a signal from the vibration sensor 42 passes through a noise filter 46, is amplified by an amplifier 48, and is transmitted to the controller 50. Based on the signal from the vibration sensor 42, the controller 50 may perform the feedback control to compensate the signal waveform supplied to the driving coil driver and the biasing coil driver.

Specific examples of the control include the following.

The controller 50 outputs an electric signal to supply a waveform of 150 Hz to the driving coil 12 and to supply a current of the current value $I_1$ to the biasing coil 22B. Subsequently, determining based on the signal from the vibration sensor 42 that the frequency of the waveform of the vibration sensor 42, which is the actual vibration of the linear vibration motor 2, deviates from 150 Hz, the controller 50 compensates an output signal of the second controller 54 to vary the current value for the biasing coil 22B. The controller 50 compensates the output signal of the second controller 54, for example, to increase the current value $I_1$ for the biasing coil 22B when the resonant frequency needs to be increased, and to decrease the current value $I_1$ for the biasing coil 22B when the resonant frequency needs to be decreased.

Further, determining based on the signal from the vibration sensor 42 that the amplitude of the waveform of the vibration sensor 42 deviates from the predetermined range, the controller 50 compensates the output signal of the first controller 52 to vary the current supplied to the driving coil 12. When the linear vibration motor 2 may not obtain a desired vibration amplitude, for example, the current supplied to the driving coil 12 is compensated. More specifically, the controller 50 compensates the output signal of the first controller 52 to increase the current supplied to the driving coil 12 when the vibration amplitude is small, and to decrease the current supplied to the driving coil 12 when the vibration amplitude is large.

In the time chart of the biasing coil in the lower side of FIG. 12B, a thin line (e.g., a straight line) indicates the optimum current values (design values) $I_1$ and $I_2$ supplied to the biasing coil 22B when a waveform of 150 Hz or 100 Hz is supplied to the driving coil 12, and a thick line indicates the actual current value by the feedback control. The optimum current values (e.g., design values) $I_1$ and $I_2$ indicated by the thin line are similar to those in the time chart in FIG. 10. In the example illustrated in FIG. 12B, since the number of vibrations of the linear vibration motor 2 detected by the vibration sensor 42 does not reach the target number of vibrations with the design value of the optimum current, $I_1$ ($I_2$)+$\Delta I$ ($\Delta I$ is compensation amount) is the substantial optimum current value. A slight time delay occurs in each of the initial stage of the start of controlling the number of vibrations, but the currents are gradually stabilized.

By performing the feedback control as described above, a desired vibration can be reliably transmitted to a user of the apparatus to which the linear vibration motor 2 is attached. At this time, in a case that a mechanical spring or an invariable magnetic spring is used, the current waveform to be supplied to the driving coil driver may be varied by the feedback control, but an adjustment of the biasing coil for varying the resonant point may not be possible. As in the linear vibration motor 2 according to the above-described embodiment, only making the magnetic force of the magnetic spring variable can achieve a feedback control capable of transmitting a desired vibration.

(Movement Support Mechanism)

Next, the structure of the movement support mechanism for reliably and stably vibrating the moving member 8 will be described using several examples. Instead of the movement support mechanism disclosed in the first embodiment, the following first to third examples may be used. In any of the examples, the movement support mechanism includes a support member fixed to the container 4 (e.g., the housing 3) and extending in the X axis direction and a contact surface provided to the moving member 8 in contact with the support member to allow movement, in the space inside the container 4 (e.g., the housing). With the configuration above, the moving member 8 can reliably and stably be vibrated in the X axis direction (first direction), and thus it is possible to obtain a stable resonant frequency characteristic.

<First Example of Movement Support Mechanism>

Figure 13A:
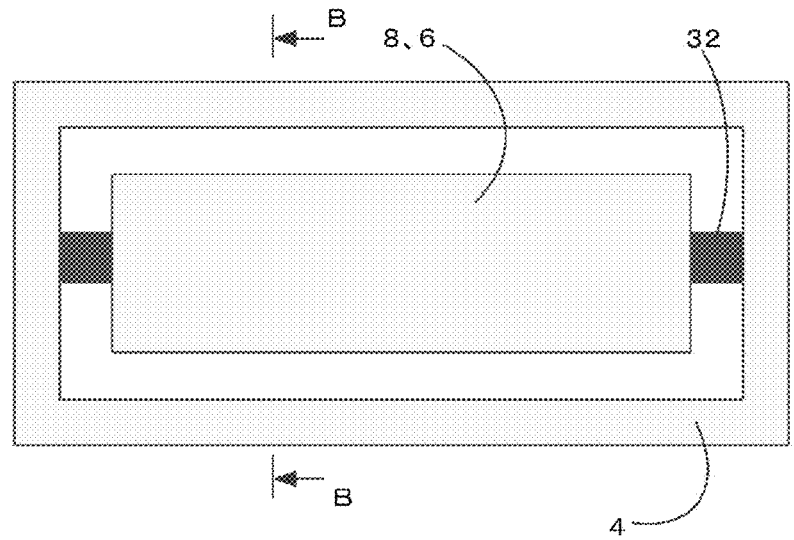
FIG. 13A is a side sectional view schematically illustrating a first example of a movement support mechanism for reliably and stably vibrating a moving member.
Figure 13B:
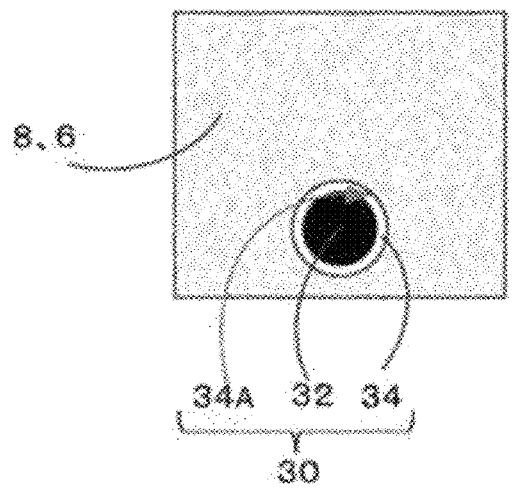
FIG. 13B is a sectional view taken along line B-B of FIG. 13A.

A first example of a movement support mechanism will be described with reference to FIG. 13A and FIG. 13B. FIG. 13A is a side sectional view schematically illustrating the first example of the movement support mechanism for reliably and stably vibrating a moving member. FIG. 13B is a sectional view taken along line B-B of FIG. 13A.

In a movement support mechanism 30 illustrated as the first example, the support member includes the shaft 32 extending in the X axis direction, and the contact surface includes an inner surface 34A of the bore portion 34 provided in the main body 6 of the moving member 8. The outer diameter of the shaft 32 and the inner diameter of the bore portion 34 are set such that the main body 6 of the moving member 8 can move on the shaft 32. As the first example, conceived is a case that the shaft 32 passes through a space in the lower part of the main body 6 of the moving member 8 in the container 4 of the linear vibration motor 2 in FIG. 2, for example.

The movement support mechanism 30 includes the shaft 32 and the moving member 8 enables the moving member 8 to be reliably and stably vibrated in the X axis direction (first direction).

<Second Example of Movement Support Mechanism>

Figure 14A:
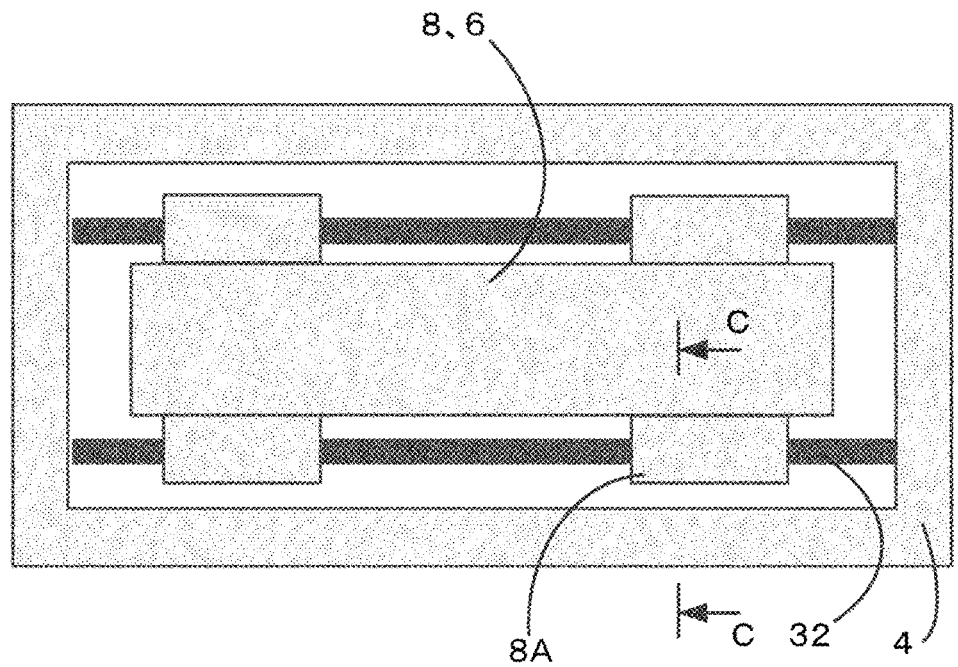
FIG. 14A is a side sectional view schematically illustrating a second example of a movement support mechanism for reliably and stably vibrating a moving member.
Figure 14B:
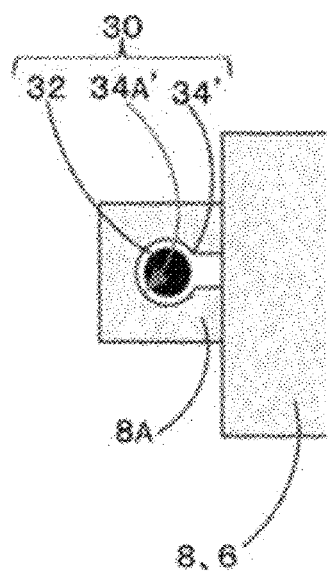
FIG. 14B is a sectional view taken along line C-C of FIG. 14A.

Next, a second example of a movement support mechanism will be described with reference to FIG. 14A and FIG. 14B. FIG. 14A is a side sectional view schematically illustrating the second example of the movement support mechanism for reliably and stably vibrating a moving member. FIG. 14B is a sectional view taken along line C-C of FIG. 14A.

In the movement support mechanism 30 illustrated as the second example, the support member includes the shaft 32 extending in the X axis direction, and the contact surface includes an inner surface 34A' of a recess portion 34' provided in the bracket 8A attached to the main body 6 of the moving member 8. The outer diameter of the shaft 32 and the inner diameter of the recess portion 34' are set such that the main body 6 of the moving member 8 can move on the shaft 32. The moving member 8 may reliably and stably be vibrated in the X axis direction (first direction) by the movement support mechanism 30 includes the shaft 32 and the recess portion 34'.

In the movement support mechanism 30 illustrated in the first embodiment, the first example, or the second example described above, a sliding bearing can be mounted between the shaft 32 and the bore portion 34 (recess portion 34'), for example. This configuration enables the friction between the outer surface of the shaft 32 and the inner surface 34A (34A') of the bore portion 34 (recess portion 34') to be reduced. A self-lubricating slide bearing may be used as the slide bearing, and a forced lubrication mechanism may be provided, or grease or lubricating oil may be injected in advance. Further, not only the slide bearing but also any other linear bearing may be used.

<Third Example of Movement Support Mechanism>

Figure 15:
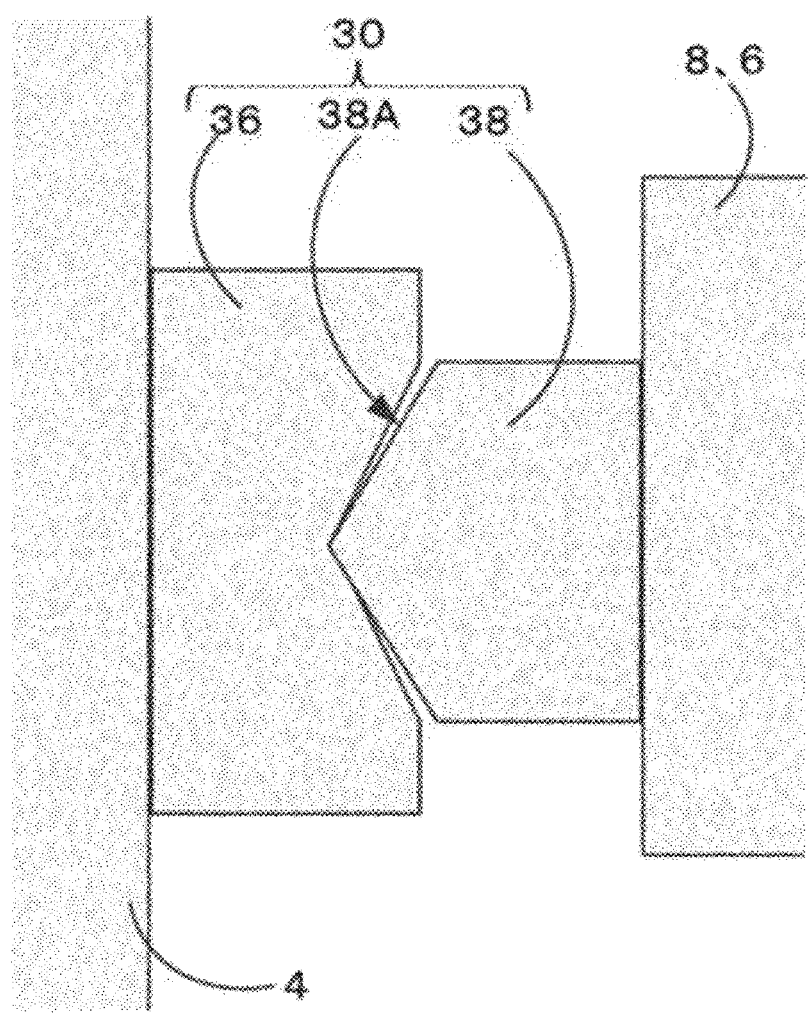
FIG. 15 is a sectional view schematically illustrating a third example of a movement support mechanism for reliably and stably vibrating a moving member.

Next, a movement support mechanism of a third example will be described with reference to FIG. 15. FIG. 15 is a sectional view schematically illustrating the third example of the movement support mechanism for reliably and stably vibrating a moving member. A section at a position similar to FIG. 14B is illustrated in FIG. 15.

In the movement support mechanism 30 illustrated as the third example, the support member includes a rail 36 extending in the X axis direction. Sliding members 38 are attached to both side surfaces of the main body 6 of the moving member 8, and a contact surface includes a sliding surface 38A provided to the sliding member 38. The rail 36 and the sliding surface 38A are disposed such that the main body 6 of the moving member 8 can move on the rail 36 in the X axis direction. Lubrication means for reducing friction is preferably provided between the rail 36 and the sliding surface 38A. The moving member 8 can reliably and stably be vibrated in the X axis direction (first direction) by such movement support mechanism 30 includes the rail 36 and the sliding member 38.

Additional Exemplary Embodiment

The drive unit 10 according to the above-described embodiments is disposed above the main body 6 of the moving member 8, but is not limited thereto. The driving coil 12 can be disposed on any side surface including the lower surface, the left surface, or the right surface of the main body 6 of the moving member 8 as long as Lorentz force is applied in relation with the driving magnets 14A and 14B. Correspondingly disposing the driving magnets 14A and 14B makes it possible to achieve the drive unit 10 vibrating the moving member 8 in the X axis direction. In a case that the drive unit 10 is disposed above the main body 6 of the moving member 8, the driving coil 12 is attached to the lid 40. Whereas, in a case that the drive unit 10 is disposed on the lower side or the lateral side of the main body 6 of the moving member 8, the driving coil 12 is attached to the bottom surface or the inner side surface of the container 4. In any cases, the driving coil 12 is disposed in the housing 3.

In the drive unit 10 according to the above-described embodiments, the driving magnets 14A and 14B having opposite polarities are disposed to face the respective windings of the driving coil 12 adjacent to each other in the X axis direction, but the present embodiment is not limited thereto. In a case that a sufficient driving force is obtained by one driving magnet, the one driving magnet disposed to face either of the windings may be provided. In contrast, in a case that a larger driving force is required, a plurality of driving coils 12 may be provided.

Even in a case that one driving coil 12 is provided, by using the driving magnet 14 of the Halbach array in which a plurality of magnets having magnetization directions different from each other is arranged, the magnetic force of the pole in the side facing the driving coil 12 may be made stronger than that of the pole in the opposite side. With this configuration, a larger driving force may be obtained by efficiently using the magnetic energy even when the total magnetic energy is the same. Thus, the linear vibration motor 2 being small in size and having a large driving force can be provided.

It is noted that the above description of the embodiments is illustrative in all respects, and is not restrictive. Variations and modifications are appropriately possible for those skilled in the art.

REFERENCE SIGNS LIST

2 LINEAR VIBRATION MOTOR
3 HOUSING
4 CONTAINER
4a FIRST INNER SIDE SURFACE
4b SECOND INNER SIDE SURFACE
6 MAIN BODY
6a FIRST END SURFACE
6b SECOND END SURFACE
6c UPPER SURFACE (ONE SURFACE)
8 MOVING MEMBER
8A BRACKET
10 DRIVE UNIT
12 DRIVING COIL
12a LOWER END PORTION (ONE END PORTION)
14A and 14B DRIVING MAGNET
20 BIAS UNIT
22 BIASING ELECTROMAGNET
22A CORE
22A1 INTERMEDIATE REGION
22A2 and A2' END REGION
22B BIASING COIL
24 HOUSING-SIDE MAGNET
26A and 26B BIASING MAGNET
30 MOVEMENT SUPPORT MECHANISM
32 SHAFT (SUPPORT MEMBER)
34 and 34' BORE PORTION, RECESS PORTION
34A and 34A' INNER SURFACE
36 RAIL (SUPPORT MEMBER)
38 SLIDING MEMBER
38A SLIDING SURFACE
40 LID
40a INNER SURFACE
42 VIBRATION SENSOR
46 NOISE FILTER
48 AMPLIFIER
50 CONTROLLER
52 FIRST CONTROLLER
54 SECOND CONTROLLER
60 DRIVING COIL DRIVER
70 BIASING COIL DRIVER
100 EXTERNAL CIRCUIT

The invention claimed is:

1. A linear vibration motor, comprising:
a housing;
a moving member disposed in the housing;
a drive unit including a driving coil disposed in the housing and a driving magnet attached to the moving member; and
a bias unit disposed in the housing and including a biasing electromagnet having a core and a biasing coil, and a biasing magnet attached to the moving member,
wherein the moving member is configured to vibrate in a first direction substantially orthogonal to a winding axis of the driving coil with a Lorentz force generated by an interaction between a magnetic field generated by the driving coil when energized and a magnetic field generated by the driving magnet, and
wherein the biasing electromagnet and the biasing magnet are disposed such that identical poles of the biasing electromagnet and the biasing magnet face each other when the biasing electromagnet is energized, and the moving member is biased in the first direction by a magnetic spring resulting from a repulsive force generated between the energized biasing electromagnet and the biasing magnet.

2. The linear vibration motor according to claim 1, wherein a magnetic spring constant of the magnetic spring varies with variation in a value of a current flowing through the biasing coil.

3. The linear vibration motor according to claim 1, wherein the bias unit further includes a housing-side magnet attached to the housing and includes a first bias unit having the biasing electromagnet and the biasing magnet and a second bias unit having the housing-side magnet and the biasing magnet, and
wherein a direction in which the moving member is moved by the first bias unit is opposite to a direction in which the moving member is moved by the second bias unit.

4. The linear vibration motor according to claim 3, wherein the first bias unit and the second bias unit are disposed to overlap with a main body of the moving member when viewed from the first direction.

5. The linear vibration motor according to claim 1, wherein the biasing coil has a winding axis that does not overlap with a main body of the moving member when viewed from the first direction.

6. The linear vibration motor according to claim 5, wherein the winding axis of the biasing coil overlaps with the biasing magnet protruding from the main body of the moving member in a direction substantially orthogonal to the first direction when viewed from the first direction.

7. The linear vibration motor according to claim 6, wherein the biasing magnet includes two magnets with the biasing electromagnet being disposed between the two magnets in the first direction.

8. The linear vibration motor according to claim 5,
wherein the biasing magnet includes two magnets disposed at both ends of the main body of the moving member in the first direction,
wherein the core includes an intermediate region around which the biasing coil is wound and two end regions on both sides of the intermediate region in the first direction,
wherein the two end regions overlap with the main body of the moving member when viewed from the first direction, and
wherein each of the two end regions substantially face a corresponding magnet of the two magnets.

9. The linear vibration motor according to claim 1, wherein the driving magnet includes two magnets that are disposed at a position such that a direction connecting opposing poles of each of the two magnets substantially coincides with the winding axis of the driving coil.

10. The linear vibration motor according to claim 9, wherein one pole of the two opposing poles of each of the two magnets is exposed at an upper surface to face a winding in a lower end of the driving coil.

11. The linear vibration motor according to claim 1, wherein DC currents in reverse directions are alternately supplied or an AC current is supplied to the driving coil.

12. The linear vibration motor according to claim 11,
wherein one end of the driving coil faces one surface of a main body of the moving member, and
wherein a direction connecting two poles of the driving magnet attached to the main body substantially coincides with a winding axis direction of the driving coil, and the driving magnet is arranged at a position at which one of the two poles facing the one surface.

13. The linear vibration motor according to claim 1, further comprising:
a support member fixed to the housing in a space inside the housing and extending in the first direction; and
a movement support mechanism having a contact surface that contacts the support member to allow movement.

14. The linear vibration motor according to claim 13,
wherein the support member includes a shaft extending in the first direction, and
wherein the contact surface includes an inner surface of a bore or a recess provided in the main body of the moving member or a member attached to the main body and into which the shaft is inserted.

15. A linear vibration system, comprising:
a linear vibration motor including:
a housing,
a moving member disposed in the housing,
a drive unit including a driving coil disposed in the housing and a driving magnet attached to the moving member, and
a bias unit that includes a biasing electromagnet having a core and a biasing coil disposed in the housing, the bias unit further including a biasing magnet attached to the moving member; and
an external circuit that supplies electric power to the driving coil and the biasing coil,
wherein the moving member is configured to vibrate in a first direction substantially orthogonal to a winding axis of the driving coil with a Lorentz force generated by an interaction between a magnetic field generated by the driving coil when energized by the external circuit and a magnetic field generated by the driving magnet, and
wherein the biasing electromagnet and the biasing magnet are disposed such that identical poles of the biasing electromagnet and the biasing magnet face each other when the biasing electromagnet is energized, and the moving member is biased in the first direction by a magnetic spring resulting from a repulsive force generated between the energized biasing electromagnet by the external circuit and the biasing magnet.

16. The linear vibration system according to claim 15, wherein a magnetic spring constant of the magnetic spring varies with variation in a value of a current flowing through the biasing coil.

17. The linear vibration system according to claim 15, wherein the external circuit further includes a controller having a first controller configured to control a current supplied to the driving coil and a second controller configured to control a current supplied to the biasing coil.

18. The linear vibration system according to claim 17,
wherein a vibration sensor is provided to the linear vibration motor, and
wherein the controller performs a feedback control based on a signal from the vibration sensor.

19. The linear vibration system according to claim 15,
wherein the bias unit further includes a housing-side magnet attached to the housing and includes a first bias unit having the biasing electromagnet and the biasing magnet and a second bias unit having the housing-side magnet and the biasing magnet, and
wherein a direction in which the moving member is moved by the first bias unit is opposite to a direction in which the moving member is moved by the second bias unit.

20. The linear vibration motor according to claim 19, wherein the first bias unit and the second bias unit are disposed to overlap with a main body of the moving member when viewed from the first direction.

\* \* \* \* \*